(12) United States Patent
Losantos Calvo

(10) Patent No.: US 11,889,814 B2
(45) Date of Patent: Feb. 6, 2024

(54) URINAL FOR PETS

(71) Applicant: STOCK GARDEN GROUP, S.L., Calahorra (ES)

(72) Inventor: Jesús Ángel Losantos Calvo, Calahorra (ES)

(73) Assignee: Stock Garden Group, S.L., La Rioja (ES)

( * ) Notice: Subject to any disclaimer, the term of this patent is extended or adjusted under 35 U.S.C. 154(b) by 90 days.

(21) Appl. No.: 17/625,456

(22) PCT Filed: Jul. 10, 2019

(86) PCT No.: PCT/ES2019/070483
§ 371 (c)(1),
(2) Date: Jan. 7, 2022

(87) PCT Pub. No.: WO2021/005248
PCT Pub. Date: Jan. 14, 2021

(65) Prior Publication Data
US 2022/0248629 A1 Aug. 11, 2022

(51) Int. Cl.
*A01K 1/01* (2006.01)
(52) U.S. Cl.
CPC .................. *A01K 1/0107* (2013.01)
(58) Field of Classification Search
CPC ............................ A01K 1/0107; A01K 1/0142
See application file for complete search history.

(56) References Cited

U.S. PATENT DOCUMENTS

| 3,964,437 A | 6/1976 | Brown | |
|---|---|---|---|
| 2009/0151646 A1* | 6/2009 | Crawford | A01K 1/0107 119/169 |
| 2012/0073507 A1 | 3/2012 | Anderson | |

FOREIGN PATENT DOCUMENTS

| AT | 001417 U1 | 5/1997 | |
|---|---|---|---|
| DE | 2658140 A1 | 7/1978 | |
| DE | 3602184 A1 | 7/1987 | |
| ES | 2306627 B1 | 10/2009 | |
| ES | 2331987 B1 | 11/2010 | |
| ES | 2431919 A1 | 11/2013 | |
| ES | 1187314 U | 7/2017 | |
| ES | 1230274 U | 5/2019 | |
| JP | 11169004 A * | 6/1999 | |
| JP | 2007312713 A * | 12/2007 | A01K 1/0107 |
| JP | 4890300 B2 * | 3/2012 | |

* cited by examiner

*Primary Examiner* — Magdalena Topolski
*Assistant Examiner* — Alanna K Peterson
(74) *Attorney, Agent, or Firm* — The Webb Law Firm

(57) ABSTRACT

A urinal for pets, intended for dogs, which can be installed in public roads and in private roads. The purpose of the disclosure is to create an area where animals can urinate in hygienic conditions that prevent the deterioration and poor image of the urban environment, the urinal being retractable and self-cleaning. The urinal can be installed flush with the ground or below the ground and is based on a pair of concentric tubes, one of which is moveable with respect to the other, being at rest in the retracted position, that is, when not in use, while, when in use, one of the tubes for receiving the animal urine is visible. When returned to the rest position, the tube for receiving the animal urine is cleaned by means of a cleaning fluid. In addition, the urinal can be integrated into the surroundings, since it can incorporate a decorative element.

15 Claims, 7 Drawing Sheets

URINAL FOR PETS

CROSS-REFERENCE TO RELATED APPLICATION

This application is the United States national phase of International Application No. PCT/ES2019/070483 filed Jul. 10, 2019, the disclosure of which is hereby incorporated by reference in its entirety.

OBJECT OF THE INVENTION

The following invention relates to a urinal for pets, essentially intended for dogs which can be installed both in public roads and in private roads. The object of the invention is to create an area where animals can urinate in hygienic conditions that prevent the deterioration and poor image of the urban environment. It is a retractable and self-cleaning urinal, which can incorporate a decorative element that enables the integration thereof into the surroundings.

BACKGROUND OF THE INVENTION

It is a well-known fact that the problems caused in our urban surroundings as a result of animal urine are increasingly notable, physically and aesthetically damaging sidewalks, streetlights, cars, gardens, etc. This deterioration affects all urban furniture, garden areas and public roads, also giving an unhygienic appearance.

Likewise, large expenses derived from this problem are known, as the investment allocated for the cleaning of public roads, replacement and/or repairs of urban furniture does not stop growing, in addition to the fact that said investments do not solve the existing problem, continuously creating unnecessary and repetitive extra costs.

The constant increase in the number of pets in our cities is another factor, making it increasingly necessary to have a service that makes it possible to prevent all these problems, as well as prevent the exasperation of citizens in general.

Thus, we can consider different documents that try to solve the aforementioned serious drawback, such as document ES 1187314 U wherein an outdoor urinal device for dogs is described. It is based on a cylindrical structure made up of a back metal sheet and a single angle for receiving urine, wherein said elements are solidly attached by a lower plate that has a central drain and a circular upper support.

Document ES 1230274 U describes a canine public urinal-marker, based on a receptacle formed by a surrounding external body, which has a lateral opening, and a central internal body that is accessible from said lateral opening to be used as the main marking area.

Document ES 2306627 B1 describes a urinal for companion animals, based on a container for receiving urine treatment materials and/or urine attractant, equipped with a perforated upper cover that defines the urine receiving area.

Document ES 2331987 B1 describes a urinal for dogs, based on a hollow column arranged on a sump, the column being formed by a first lower section and a second upper section that partially surrounds the first section, a channel for the passage of a flow of water from an external supply source towards an outlet mouth located in the upper inner portion of the second upper section and actuation means for actuating the water outlet having been provided.

DESCRIPTION OF THE INVENTION

The present specification describes a urinal for pets, in that the urinal is installed flush with the ground or below the ground and it comprises:

two concentric tubes, able to slide one with respect to the other, due to the action of a fluid, a tube being receiver of the pet urine;

a third tube that is fixed and internal to the tube receiver of the urine;

a tray for receiving the urine and a cleaning fluid;

a compartment for collecting the urine and the cleaning fluid;

a drain connected to the compartment for collecting the urine and the cleaning fluid;

a counterweight solidly attached to the moveable tube;

a first ring for guiding the moveable tube;

a second cleaning ring through which the cleaning fluid is supplied;

the moveable tube incorporates an element which, in the rest position, covers the receiving tray and the compartment for collecting the urine and the cleaning fluid;

a first branch of a fluid piping connected to the chamber created in the third tube, and;

a second branch of the fluid piping connected to the cleaning means for cleaning the tube receiver of the urine and the tray for receiving the urine, the piping of which has a three-way stopcock, such that in the rest position both concentric tubes are in their retracted position, and in the position of use the tube for receiving the pet urine with a smaller diameter is visible by having moved, in an axial direction, a tube with respect to the other and, when returned to the rest position after use, the tube receiver of the pet urine is cleaned.

In this manner, the urinal being mounted flush with the ground, the tube receiver of the pet urine with a smaller diameter is fixed, by the lower base thereof, to the tray for receiving the pet urine.

The urinal being mounted flush with the ground, the tray for receiving the pet urine and a cleaning fluid is attached to the compartment for receiving the urine and the cleaning fluid, defining a clear space between them. The receiving tray has an inclination in a decreasing direction from the internal portion for fixing to the tube with a smaller diameter, towards the outside, the perimeter contour of which is under the upper external lateral surface of the compartment for receiving the urine and the cleaning fluid and with a separation between them.

The urinal being mounted flush with the ground, the tube with a smaller diameter has on the upper lateral surface thereof a first ring for guiding the moveable external tube with a larger diameter.

The urinal being mounted flush with the ground, the tube with a larger diameter on the lateral surface thereof, relative to the lower base, has a second cleaning ring, second cleaning ring which on the inner surface thereof has a watertight seal and between the bases thereof has a plurality of through holes, such that the watertight seal abuts on the receiver tube and the cleaning fluid flows through the holes made between the bases thereof.

The urinal being mounted flush with the ground, a piston is housed inside the third tube with a rod solidly attached to the outer tube creating a chamber that is connected to a first branch of the fluid piping with a three-way stopcock.

Likewise, the urinal being mounted flush with the ground, between the third fixed tube and the tube receiver of the urine, it incorporates a piping that extends from the lower base thereof to the lower portion of the first ring solidly attached to the tube receiver of the pet urine with a smaller diameter, and said axial piping extends outward from the tube receiver of the urine defining a first mouth and the axial piping is connected, at the bottom, to a second branch of the fluid piping with a three-way stopcock.

Likewise, the urinal being mounted below the ground, the tube receiver of the pet urine with a smaller diameter is moveable, sticking out to the outside and leaving the tray for receiving the pet urine clear.

The urinal being mounted below the ground, the compartment for receiving the urine and the cleaning fluid is mounted on the upper base of the fixed external tube. Inside, it houses the second cleaning ring through the inside of which the receiver tube moves, defining a space along the perimeter of the compartment to which the second branch of the fluid piping is connected. Above the compartment and the perimeter space thereof, it has a tray for receiving the urine and the cleaning fluid, which has a decreasing inclination from the perimeter to the central portion thereof in which it defines an opening with the moveable receiver tube, through the opening of which the cleaning fluid passes to fall on the second cleaning ring.

Likewise, the urinal being mounted below the ground, the tube receiver of the urine is moveable and has a first guiding ring on the lower lateral surface thereof.

The urinal being mounted below the ground, on the external tube with a larger diameter, the compartment for receiving the urine and the cleaning fluid is defined, inside of which and isolated from it, it has the second cleaning ring, through the inside of which the tube receiver of the urine with a smaller diameter moves.

The urinal being mounted below the ground, under the tray for receiving the urine and along the perimeter of the compartment for receiving the urine and the cleaning fluid, a space is defined connected to the second branch of the fluid piping with a three-way stopcock, from which space the fluid overflows, along the perimeter, into the tray for receiving the urine and discharges onto the second cleaning ring.

The urinal being mounted below the ground, the third tube that is fixed and internal to the tube receiver of the urine houses a piston with a rod solidly attached to the tube receiver of the urine, creating a chamber connected to a first branch of the fluid piping with three-way stopcock.

Likewise, the urinal being mounted below the ground, the moveable receiver tube is finished externally in a closing element for closing the contour of the space defined along the perimeter of the compartment and the space of which is connected to the second branch of the cleaning fluid piping.

Both equivalent practical embodiments enable a decorative element to be incorporated, such as a flowerpot, to facilitate the integration thereof into the surroundings, so that in the retracted position of the urinal, it is concealed from view and only becomes visible in the work position.

To complement the following description and for the purpose of helping to better understand the features of the invention, a set of drawings is attached to the present specification, in the figures of which, in an illustrative and not-limiting manner, the most characteristic details of the invention are represented.

BRIEF DESCRIPTION OF THE DESIGNS

Figure 1:
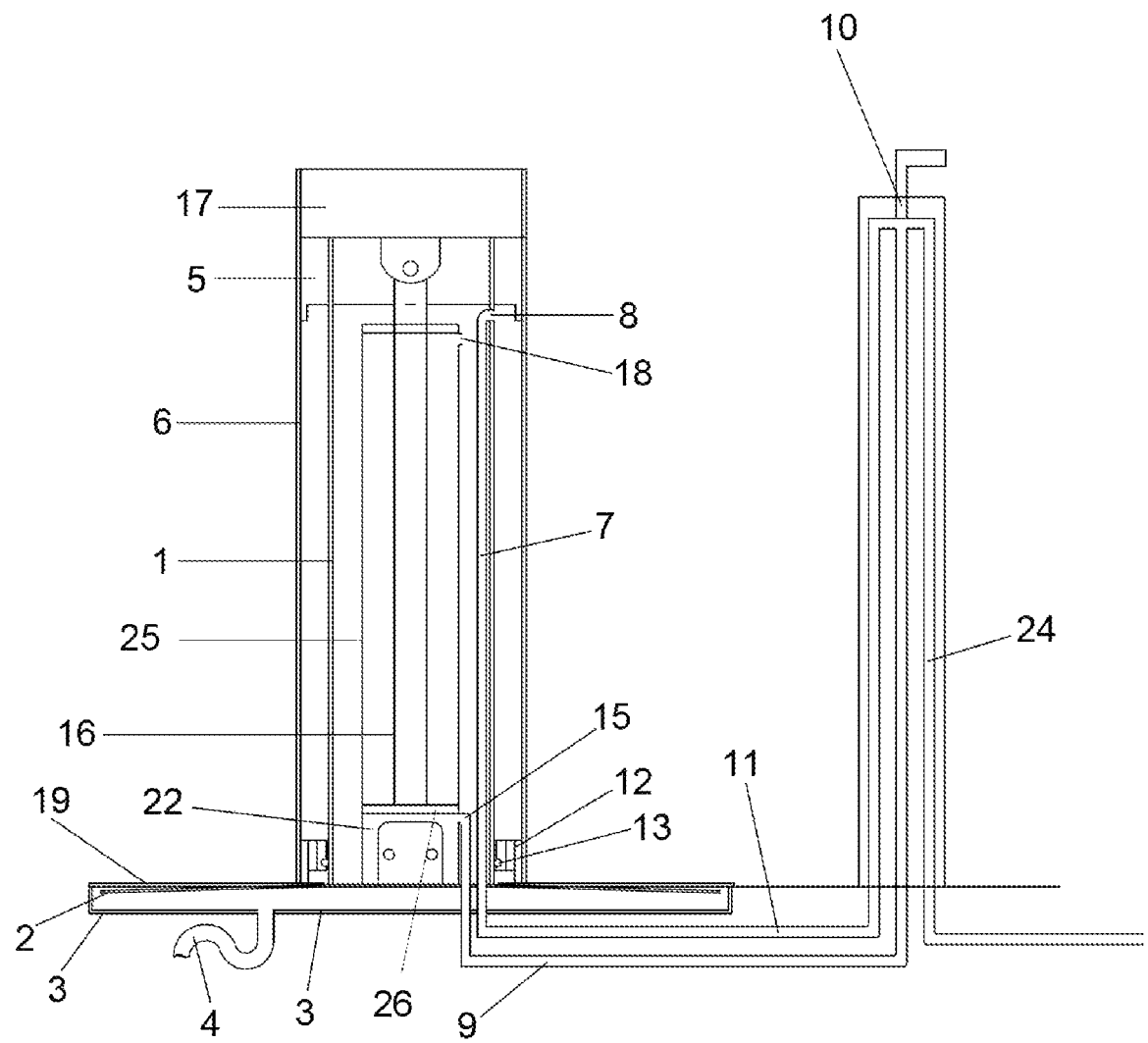
FIG. 1 shows a cross-sectional side elevation view of the urinal, according to the embodiment thereof above the ground, in the retracted position.
Figure 2:
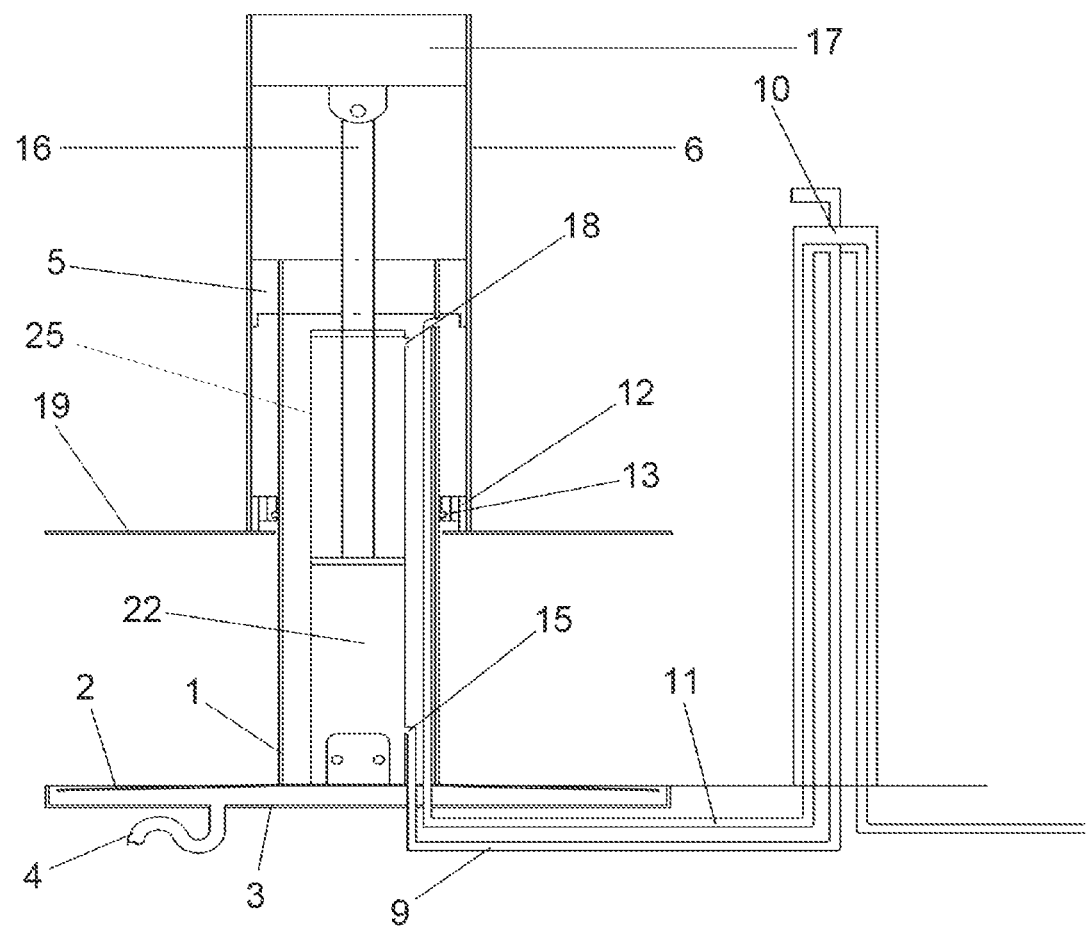
FIG. 2 shows a cross-sectional side elevation view of the urinal, according to the embodiment thereof above the ground, after opening the stopcock and the fluid starting to enter through the first branch of the fluid piping towards the chamber created in the third fixed tube, the outer tube with a larger diameter having partially moved towards the use position.

1: Receiver tube
2: Tray in the embodiment wherein the urinal is flush with the ground
2': Tray in the embodiment wherein the urinal is below the ground
3: Compartment for receiving urine and cleaning fluid
4: Drain
5: First ring
6: Outer tube
7: Axial hole
8: First mouth
9: First branch
10: Stopcock
11: Second branch
12: Second ring
13: Seal
14: Second ring through holes
15: Second mouth
16: Rod
17: Counterweight
18: Perforation for air inlet and outlet
19: Closing element
20: Perimeter space
21: Side wall
22: Chamber
23: Decoration
24: Overall network
25: Third fixed tube
26: Piston

DESCRIPTION OF A PREFERRED EMBODIMENT

In view of the aforementioned figures and according to the adopted numbering we can see how the urinal for pets can be installed flush with the ground or below the ground, conforming to a retractable and self-cleaning structure. It can be mounted on public or private roads, creating an area wherein pets can urinate with adequate hygienic measures that prevent the deterioration and the poor image usually shown, while in the rest position it adopts a beautifying image integrated into the surroundings in which it is installed.

For this, the urinal for pets is based on a structure that comprises two concentric tubes (1, 6) able to slide, one with respect to the other, due to the action of a fluid, the tube with a smaller diameter being a receiver tube (1) of the pet urine. The urine moves along the outside of the receiver tube (1), towards a tray (2, 2') for receiving the urine and a cleaning fluid, to be collected in a compartment (3) for collecting the urine and the cleaning fluid that is equipped with a drain (4).

Furthermore, the tube with a larger diameter is the outer tube (6) of the concentric tubes. In each embodiment, depending on whether the urinal is installed flush with the ground or below the ground, the moveable tube is one of the two concentric tubes (the outer tube (6) when installed flush with the ground and the receiver tube (1) when installed below the ground). The moveable tube incorporates a counterweight (17) and is guided by a first ring (5), while the receiver tube (1) of the urine is in contact with a second cleaning ring (12), arranged in the outer tube (6), through which the urine cleaning fluid is supplied.

Likewise, the moveable tube (be it the receiver tube (1) or the outer tube (6)), incorporates a closing element (19) which, in the rest position of the urinal, covers the receiving tray (2, 2') and the compartment (3) for collecting the urine and the cleaning fluid. This closing element (19) enables the entire assembly to be concealed and inaccessible, except in the use position.

The urinal for pets incorporates a third tube (25) that is fixed and internal to the receiver tube (1) of the pet urine, inside of which it houses a piston (26) solidly attached to a rod (16) that is fixed to the moveable tube, creating a chamber (22) for depositing the fluid.

Likewise, the urinal comprises a cleaning fluid piping which in turn comprises a first branch (9) connected with the chamber (22) created in the third fixed tube (25), and a second branch (11) connected with cleaning means for cleaning the receiver tube (1) of the urine and the tray (2, 2') for receiving the urine, the piping of which has a three-way stopcock (10).

Starting from this generic structure, the urinal can be installed flush with the ground or below the ground. In a preferred embodiment, the urinal will be flush with the ground, and, in this case, the receiver tube (1) of the pet urine with a smaller diameter is fixed, as is the third tube (25) that is fixed and internal thereto, and the outer tube (6) with a larger diameter is moveable due to the supply of a fluid through a second passage mouth (15) to the chamber (22) created in the third fixed tube (25), through a first branch (9) of a fluid piping with a three-way stopcock (10).

In this manner, when opening the passage by means of the stopcock (10) the fluid will be led from the overall network (24) to the first branch (9), the fluid accessing the chamber (22). When closing the stopcock (10) the fluid contained in the chamber (22), due to the action of the counterweight (17), exits through the second mouth (15) and flows through a second branch (11) towards an axial piping (7) present between the space between the third fixed tube (25) and the receiver tube (1) of the pet urine, exiting through a first mouth (8) towards the second cleaning ring (12).

Thus, in said embodiment, the receiver tube (1) is integral with a tray (2) for receiving the urine and the cleaning fluid thereof. The tray (2) has a decreasing inclination from a central section for fixing to the receiver tube (1) to the perimeter contour thereof. Below said tray (2) there is a compartment (3) for receiving the urine and the cleaning fluid to which the corresponding drain (4) is connected.

The tray (2) can be attached to the compartment (3) by means of screws or other equivalent means creating a hollow between the tray (2) and the compartment (3) for collecting the urine and the cleaning fluid and subsequent drainage thereof. Thus, the perimeter contour of the tray (2) is slightly below the level of the side walls of the compartment (3) and with a small separation between them for the passage of the urine and the cleaning fluid.

In the upper external portion thereof, the receiver tube (1) incorporates a first ring (5) for guiding the outer tube (6) with a larger diameter during the movement thereof. Between the third fixed tube (25) and the receiver tube (1) it comprises an axial piping (7) extended from the fixed lower base thereof to the lower portion of the first guiding ring (5) of the outer tube (6). Said axial piping (7) extends outwards from the receiver tube (1), in a radial direction defining a first mouth (8) for the outlet of cleaning fluid. Thus, the aforementioned axial piping (7) is connected to a second branch (11) of the fluid piping with a three-way stopcock (10) by the lower base thereof, so that when the fluid penetrates through said second branch (11) it will exit through the first mouth (8) to clean the receiver tube (1).

For this, the outer tube (6) incorporates a second cleaning ring (12) in the lower base thereof, through the inside of which the receiver tube (1) passes with the interposition of a watertight seal (13), the second cleaning ring (12) of which has two bases between which there are through holes (14).

Figure 3:
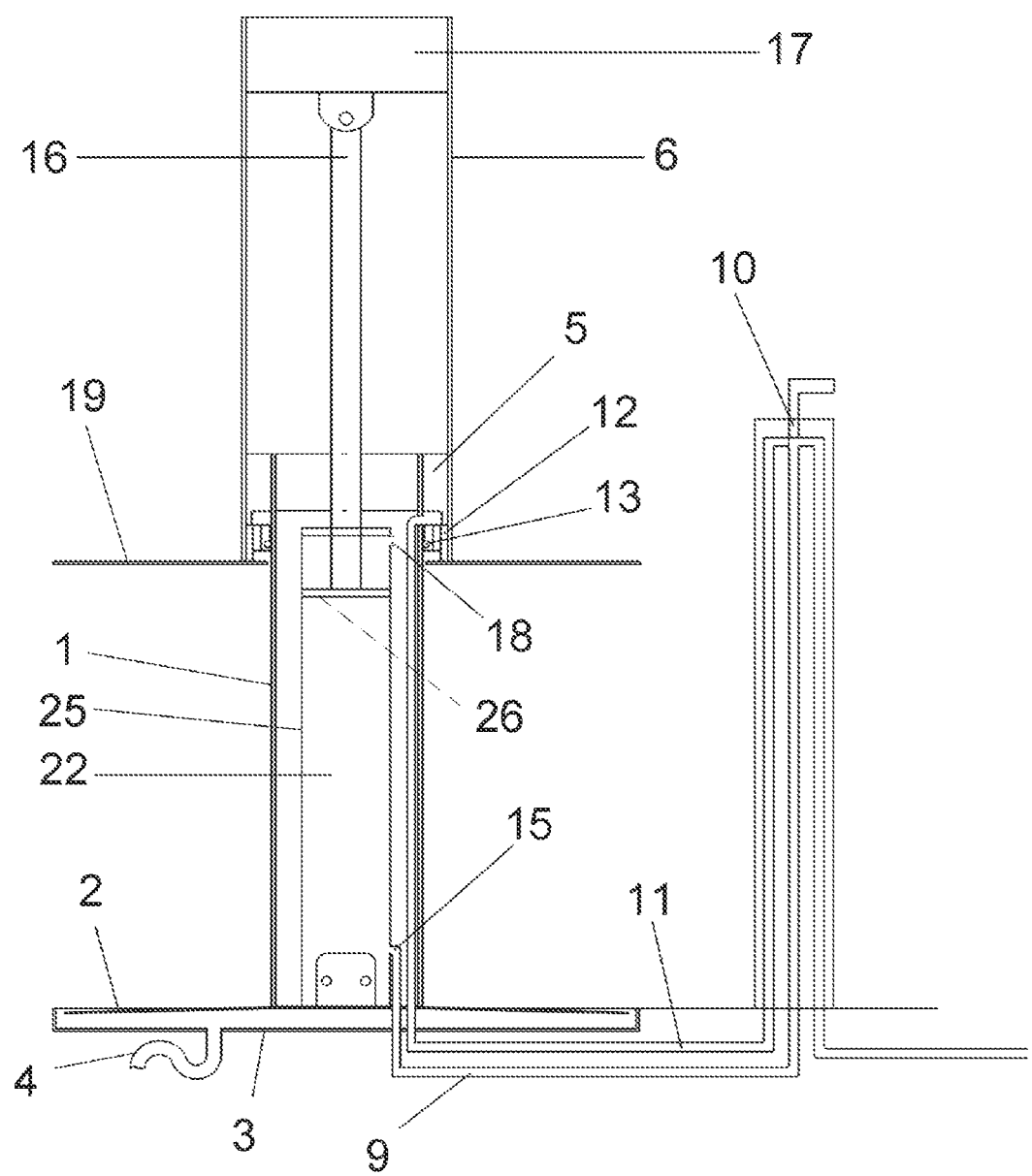
FIG. 3 shows a cross-sectional side elevation view of the urinal, according to the embodiment thereof above the ground, the tube with a larger diameter having moved to the use position, fully moved, remaining in a static position, so that pets can urinate.

In this manner, starting from the position represented in FIG. 1 in which the urinal is in the rest position with the receiver tube (1) and the outer tube (6) in the retracted position. To make use of it, the stopcock (10) is opened, the fluid, normally water, entering along the first branch (9) through the second mouth (15) to the chamber (22) created in the third tube (25) causing the piston (26) and the rod (16) to move and the consequent movement of the outer tube (6), until it reaches the use position, as shown in FIG. 3, enabling the urinal for use.

Thus, in said position the pet will be able to urinate on the receiver tube (1) and once the pet has finished urinating, the stopcock (10) of the fluid piping is acted upon, enabling the external tube (6), through the own action of the counterweight (17) that it incorporates, to descend causing the outlet of the fluid contained in the chamber (22) through the second mouth (15). The fluid exits through the first branch (9) and passes to the second branch (11) entering through the piping (7) until it exits through the first mouth (8), falling on the second cleaning ring (12) that distributes it and passes through the through holes (14) thereof towards the receiver tube (1) of the urine, which is cleaned by sliding the seal (13) dragging the urine and the spilled fluid therethrough.

Thus, the urine, together with the dragging fluid thereof, falls on the tray (2) for receiving the same and is led to the compartment (3) for draining from it.

The chamber (22) created in the third fixed tube (25) has the corresponding perforation (18) for the outlet and inlet of air, enabling the perfect operation thereof.

Likewise, a closing element (19) is solidly attached to the outer tube (6), based on a metal plate, for example, which, when in the rest position, will remain on the tray (2) and the compartment (3) closing the contour of the same and preventing access when the urinal is not in use.

Figure 4:
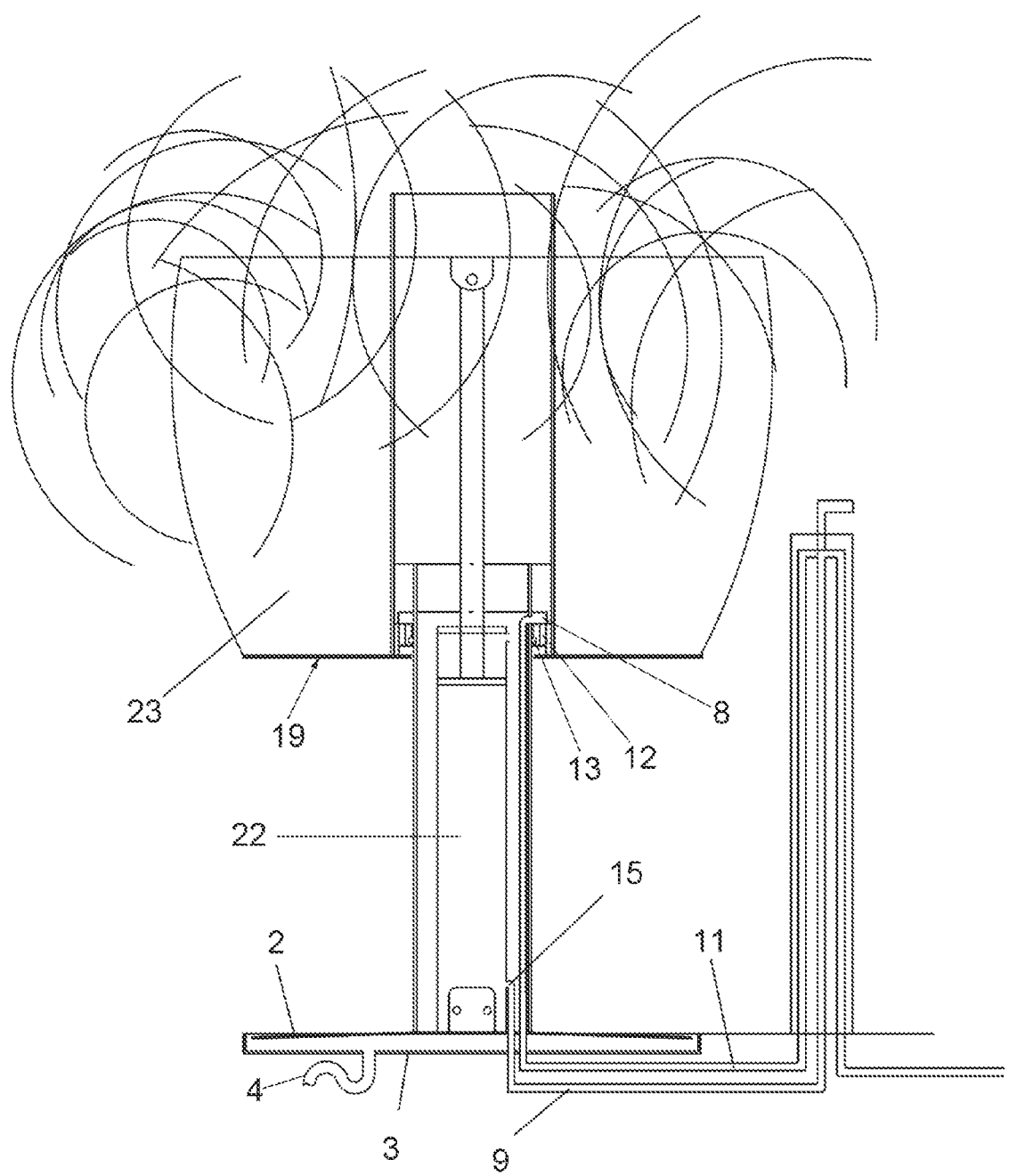
FIG. 4 shows a view of the previous figure in which a decorative element has been incorporated, which can be a flowerpot.

As can be seen in FIG. 4, a decoration (23), such as a flowerpot, can be incorporated on the closing element (19), so that in the rest position the urinal remains concealed and perfectly integrated into the surroundings.

Figure 5:
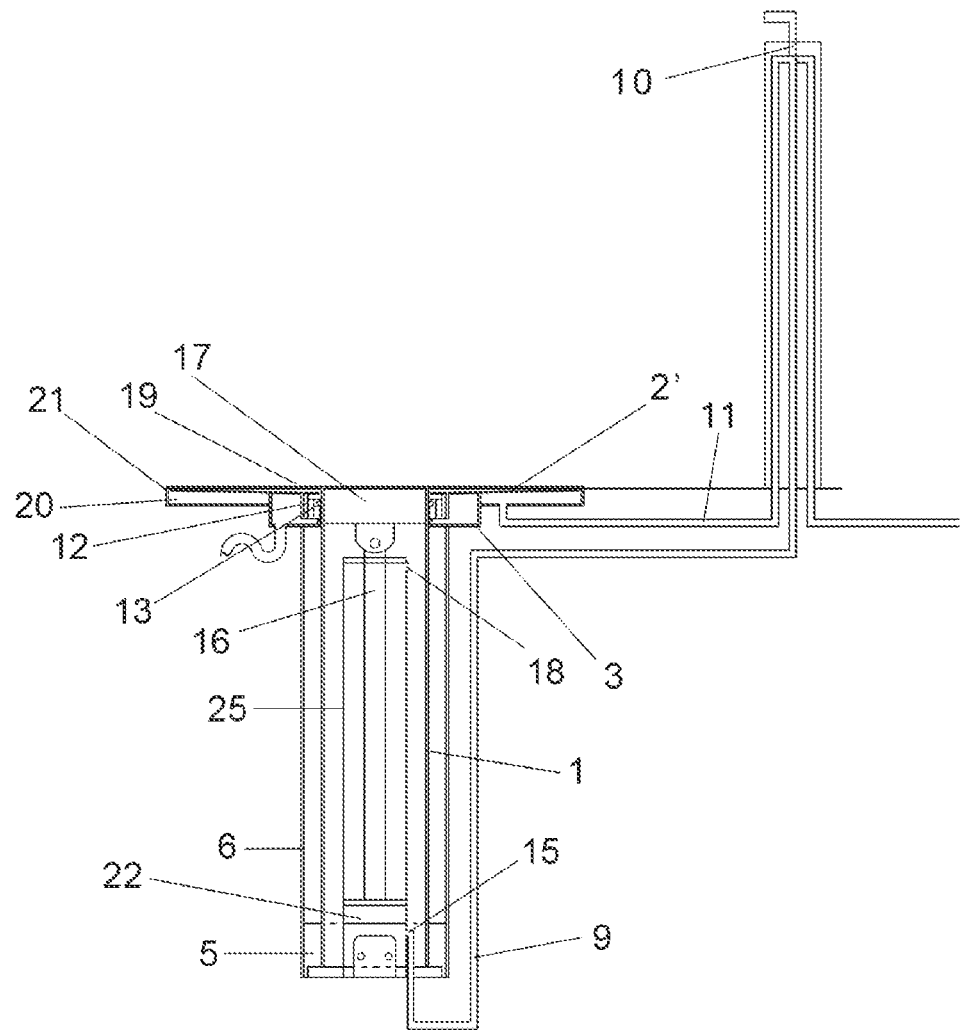
FIG. 5 shows a cross-sectional side elevation view of the urinal, according to the embodiment thereof below the ground, in the retracted position.
Figure 6:
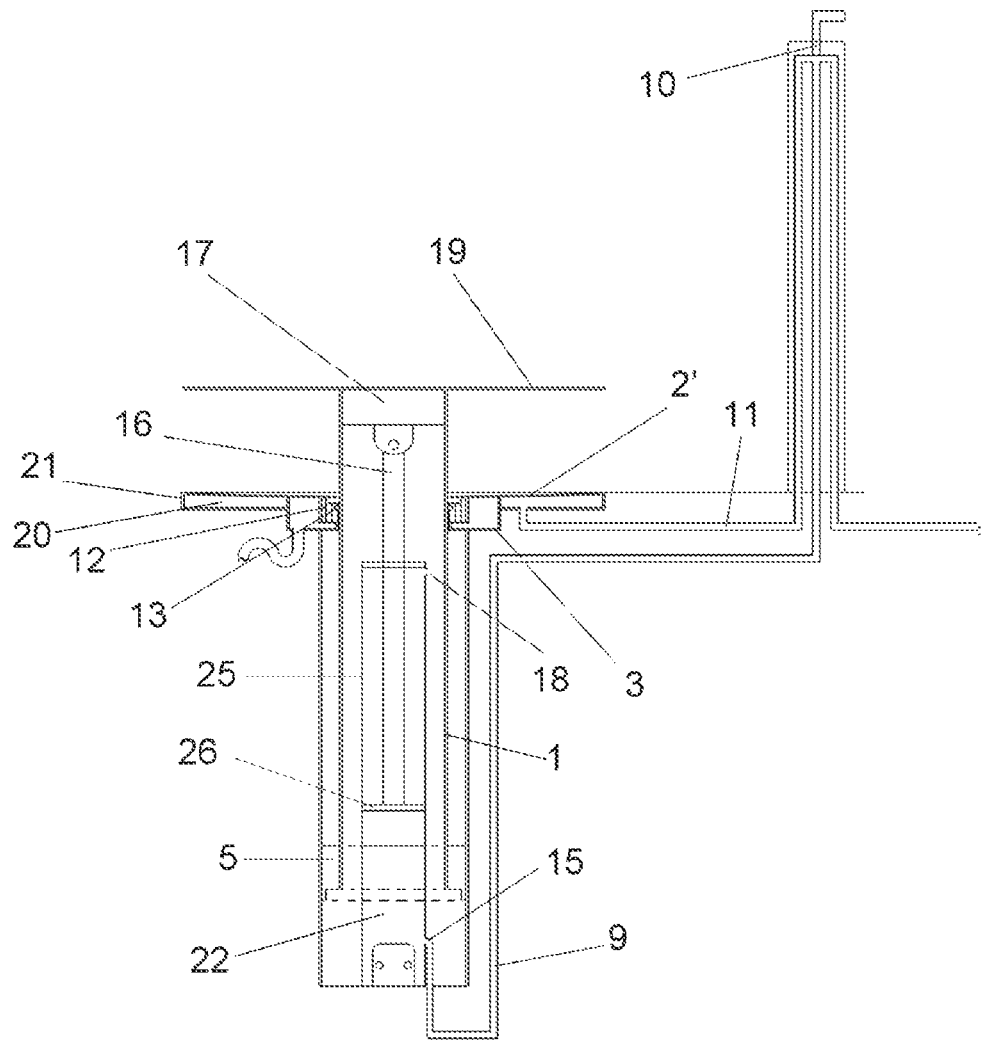
FIG. 6 shows a cross-sectional side elevation view of the urinal, according to the embodiment thereof below the ground, after opening the stopcock and the fluid starting to enter through the first branch of the fluid piping towards the chamber created in the third fixed tube, the tube with a smaller diameter having partially moved towards the use position.

In a practical embodiment variant of the invention, as can be seen in FIGS. 5 and 6, the urinal can be installed below the ground, so that in this embodiment the receiver tube (1) of the urine and counterweight carrier (17) is moveable with respect to the outer tube (6) that remains fixed, installed below the ground, and the closing element (19) is integral with the receiver tube (1).

Likewise, the receiver tube (1), able to move in relation to the internal base thereof, incorporates the first guiding ring (5) by means of which it is perfectly guided in the movement thereof, with respect to the outer tube (6), while the cleaning fluid accesses the chamber (22) created in the third fixed tube (25).

The outer tube (6) is finished off by the compartment (3) for receiving the urine and the cleaning fluid, which incorporates the second cleaning ring (12) therein through the inside of which the receiver tube (1) with a smaller diameter moves, making contact with the watertight seal (13). Along the perimeter of the compartment (3) for receiving the urine and the cleaning fluid, it has a perimeter space (20) connected to the second branch (11) of the fluid piping.

Thus, on the compartment (3) for receiving the urine and the cleaning fluid is the tray (2') for receiving the urine and onto which the cleaning fluid is poured, coming from the second branch (11) of the piping connected to the space (20) defined along the perimeter of the compartment (3).

The tray (2') arranged on the compartment (3) and the space (20) defined along the perimeter thereof, has a decreasing inclination from the external perimeter to the inside, where it is finished in proximity to the receiver tube 1, defining an opening between them. Along the perimeter, the tray (2') is below the level of a side wall (21) that makes up the space (20), so that the fluid coming from the second branch (11) that fills the space (20) can overflow along the perimeter towards the tray (2'). As it passes therethrough, the urine present therein is dragged and cleaned, all of this leading towards the second cleaning ring (12) and subsequent passage to the compartment (3).

In this manner, starting from the urinal in the rest position, according to FIG. 5, to start the process so that a pet can make use of the same, first the stopcock (10) is opened, the fluid circulating through the first branch (9) of the piping and penetrating through the second mouth (15) into the chamber (22) defined in the third tube (25), the receiver tube (1) of the pet urine raising to the raised use position.

Once the pet has urinated and the stopcock (10) has been closed, due to the action of the counterweight (17), the descent of the receiver tube (1) begins, so that the fluid contained in the chamber (22) is dislodged through the second mouth (15). The fluid dislodged along the first branch (9) passes to the second branch (11) through which it is led to the space (20) until it overflows along the perimeter of the same, descending through the tray (2'), dragging the possible urine present on the same and falling, through the opening or gap between the receiver tube (1) and the tray itself (2') towards the second cleaning ring (12). Thus causing in the descent of the receiver tube (1) the cleaning of the same with the collaboration of the seal (13) that abuts on the receiver tube (1). The urine-cleaning fluid mixture flows through the through holes (14) of the aforementioned second cleaning ring (12) towards the compartment (3) where it is drained.

In this manner, when the receiver tube (1) descends, it is cleaned and when it reaches the rest position, the closing element (19) is covering the entire contour of the space (20).

On said closing element (19) there may be a decoration (23) such as a pot with plants, integrating perfectly into the surroundings.

Figure 7:
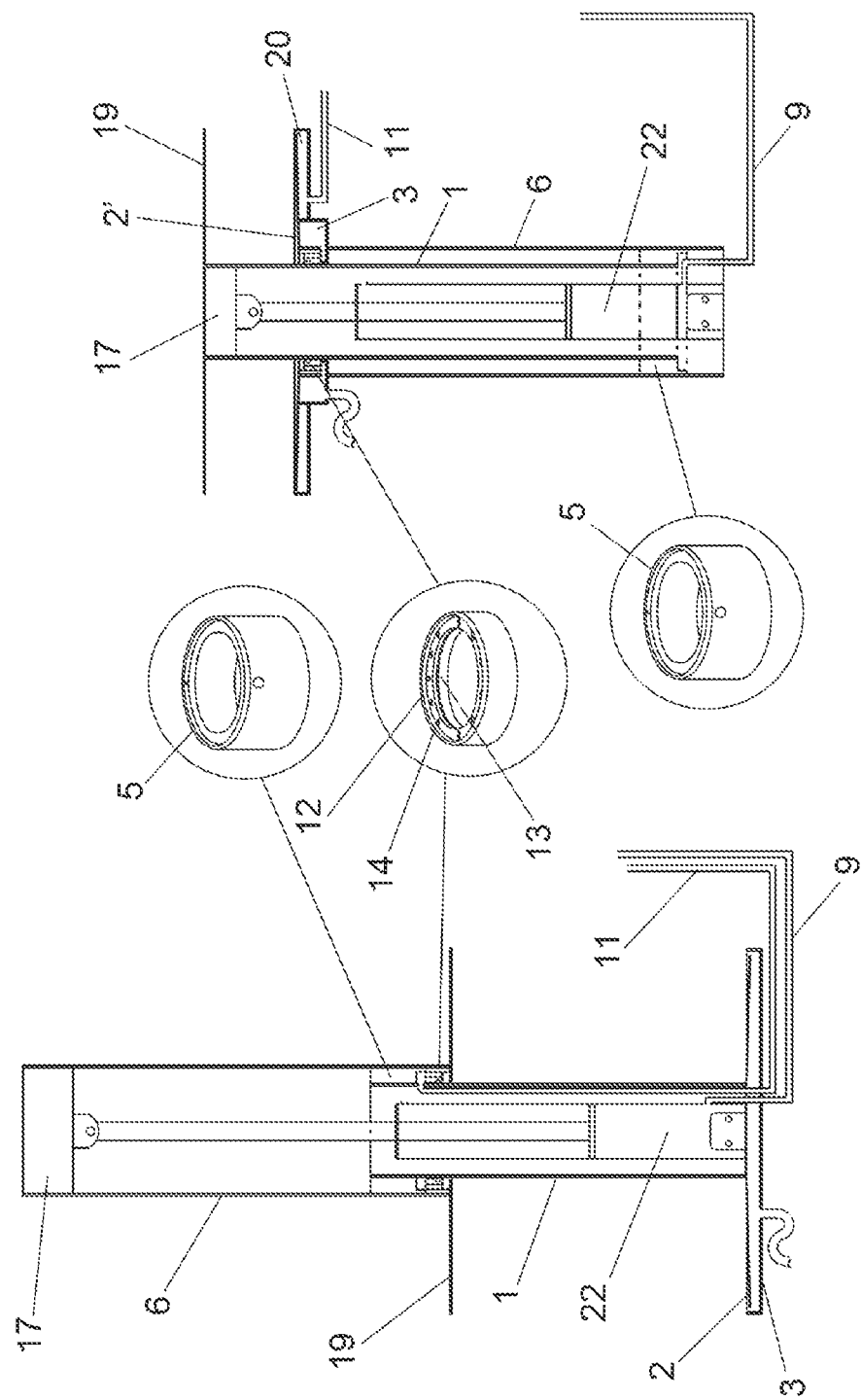
FIG. 7 shows a cross-sectional side elevation view, according to both assembly embodiments, having represented the assembly point of the first guiding ring and of the second cleaning ring, according to one embodiment or the other.

FIG. 7 shows the small differences between the urinal installed flush with the ground and the urinal installed below the ground, which make them equivalent, so that the first ring (5) in the embodiment relative to the installation flush with the ground is fixed to the upper base of the fixed receiver tube (1) with a smaller diameter and in the embodiment related to the installation below the ground, the aforementioned first guiding ring (5) is integral with the lower base of the moveable receiver tube (1) with a smaller diameter. The second cleaning ring (12) in the embodiment related to the installation flush with the ground is integral with the lower base of the outer tube (6) that is moveable along the receiver tube (1), the watertight seal (13) thereof abutting on the external surface thereof and in the embodiment relative to the installation below the ground, it remains on the upper base of the fixed outer tube with the watertight seal (13) thereof abutting on the external lateral surface of the receiver tube (1) that passes through the inside thereof.

Likewise, the tray (2) for receiving the urine and cleaning fluid in the embodiment relative to the installation flush with the ground has an inclination in a decreasing direction from the central portion to the perimeter portion thereof, collecting the urine and cleaning fluid for leading thereof to the compartment (3) to drain it. In the embodiment relative to the installation below the ground, the tray (2') for collecting the urine and cleaning fluid has an inclination, in a decreasing direction, from the perimeter to the central portion thereof in which it defines an opening with the receiver tube (1).

Ultimately, the purpose of the urinal according to both embodiments is to create an area where pets can urinate in hygienic conditions that prevent the deterioration and poor image of the urban environment, the urinal being retractable and self-cleaning, which can incorporate a decorative element that enables the integration thereof into the surroundings.

In addition, the urinal for pets may have means that enable the remote actuation thereof, as well as means that enable controlling the number of times of use, by the company or control body thereof.

Furthermore, the stopcock can be replaced by any equivalent means, such as by an actuation pedal or push button. Likewise, the stopcock control post can have means that provide drinking water to the pets themselves, and, likewise, the aforementioned post may have a fluid intake, preferably water, to, for example, be able to clean the assembly.

The invention claimed is:

1. A urinal for pets, wherein the urinal is mounted flush with the ground or below the ground and comprises:
    two concentric tubes, able to slide one with respect to the other, due to the action of a fluid, these being a receiver tube of the pet urine with a smaller diameter and an outer tube with a larger diameter, wherein one of the tubes is moveable between a retracted position and a use position;
    a third tube, fixed and internal to the receiver tube of the urine;
    a piston, housed in the third fixed tube, integral with a rod fixed to a sliding tube;
    a tray for receiving the urine and a cleaning fluid;
    a compartment for collecting the urine and the cleaning fluid;
    a drain connected to the compartment for collecting the urine and the cleaning fluid;

a counterweight integral with a moveable tube;
a first guiding ring for guiding the moveable tube;
a second cleaning ring through which the cleaning fluid is supplied;
the moveable tube incorporates a closing element which covers the receiving tray and the compartment for collecting the urine and the cleaning fluid in the retracted position;
a first branch of a fluid piping connected to a chamber created in the tubes in the third tube, and;
a second branch of the fluid piping connected to cleaning means for cleaning the receiver tube of the urine and the tray for receiving the urine, the piping of which has a three-way stopcock,
such that in the retracted position both concentric tubes are arranged one inside the other, and in the use position, the receiver tube for receiving the pet urine with a smaller diameter is visible by having moved, in an axial direction, one tube with respect to the other and, during the movement of the moveable tube to the retracted position after use, the receiver tube of the pet urine is cleaned.

2. The urinal for pets, according to claim 1, wherein the urinal being mounted flush with the ground, the receiver tube of the urine with a smaller diameter is integral with a lower base to the tray for receiving the pet urine.

3. The urinal for pets, according to claim 1, wherein the urinal being mounted flush with the ground, the tray for receiving the pet urine and the cleaning fluid is attached to the compartment for receiving the urine and the cleaning fluid defining a clear hollow between the tray and the compartment and the receiving tray having an inclination in a decreasing direction from an internal portion for fixing to the receiver tube towards the outside, and the perimeter contour of the tray is below an upper external lateral surface of the compartment for receiving the urine and the cleaning fluid, and with a separation between them.

4. The urinal for pets, according to claim 1, wherein the urinal being mounted flush with the ground, the receiver tube with a smaller diameter has the first guiding ring for guiding the outer moveable tube with a larger diameter in an upper lateral surface.

5. The urinal for pets, according to claim 1, wherein the urinal being mounted flush with the ground, the outer tube with a larger diameter comprises on a lateral surface, relative to a lower base, the second cleaning ring which, on an internal surface, has a watertight seal and has two bases between which a plurality of through holes are located.

6. The urinal for pets, according to claim 1, wherein the urinal being mounted flush with the ground, the piston is housed inside the third tube with the rod integral with the outer tube creating a watertight chamber that is connected to the first branch of the fluid piping with the three-way stopcock.

7. The urinal for pets, according to claim 1, wherein the urinal being mounted flush with the ground, between the third fixed tube and the receiver tube of the urine, it incorporates a piping, which extends from a lower base to a lower portion of the first ring integral with the receiver tube of the pet urine, and an axial piping extends outward from the receiver tube of the urine defining a first mouth and the piping is connected, at the bottom, to the second branch of the fluid piping with the three-way stopcock.

8. The urinal for pets, according to claim 1, wherein the urinal being mounted below the ground, the receiver tube of the pet urine with a smaller diameter is moveable, rising above the ground, and leaving the tray for receiving the pet urine clear.

9. The urinal for pets, according to claim 1, wherein the urinal being mounted below the ground, the compartment for receiving the urine and the cleaning fluid is mounted on an upper base of the fixed outer tube and inside it houses the second cleaning ring through the inside of which the receiver tube moves, defining a space on the perimeter of the compartment to which the second branch of the fluid piping is connected, having the tray for receiving the urine and the cleaning fluid above the compartment and the perimeter space thereof, said tray which has a decreasing inclination from its perimeter to a central portion in which it defines an opening with respect to the moveable receiver tube, through the opening of which the cleaning fluid passes to the second ring.

10. The urinal for pets, according to claim 1, wherein the urinal being mounted below the ground, the moveable receiver tube has the first guiding ring on a lower lateral surface.

11. The urinal for pets, according to claim 1, wherein the urinal being mounted below the ground, the compartment for receiving the urine and the cleaning fluid is defined on the outer tube, inside of which and isolated from it, it has the second cleaning ring, through the inside of which the receiver tube moves.

12. The urinal for pets, according to claim 1, wherein the urinal being mounted below the ground, a space being defined along the perimeter of the compartment that is connected to the second branch of the fluid piping with three-way stopcock such that from said space the fluid overflows, along the perimeter, into the tray, discharging on the second cleaning ring.

13. The urinal for pets, according to claim 1, wherein the urinal being mounted below the ground, the third tube that is fixed and internal to the receiver tube of the urine houses the piston with the rod integral with the receiver tube of the urine and creating the chamber connected to the first branch of the fluid piping with the three-way stopcock.

14. The urinal for pets, according to claim 1, wherein the urinal being mounted below the ground, the moveable receiver tube is topped at the top and externally with the closing element for closing the contour of a space that is connected to the second branch of a cleaning fluid piping.

15. The urinal for pets, according to claim 14, wherein on the closing element for closing the contour of a perimeter space connected to the second branch of the cleaning fluid piping, the urinal has a decoration.

* * * * *

UNITED STATES PATENT AND TRADEMARK OFFICE
CERTIFICATE OF CORRECTION

| | |
|---|---|
| PATENT NO. | : 11,889,814 B2 |
| APPLICATION NO. | : 17/625456 |
| DATED | : February 6, 2024 |
| INVENTOR(S) | : Jesús Ángel Losantos Calvo |

It is certified that error appears in the above-identified patent and that said Letters Patent is hereby corrected as shown below:

In the Claims

Column 9, Line 10, Claim 1, after "created" delete "in the tubes"

Signed and Sealed this
Second Day of April, 2024

Katherine Kelly Vidal
*Director of the United States Patent and Trademark Office*